United States Patent
Mueller

(10) Patent No.: US 8,646,380 B2
(45) Date of Patent: Feb. 11, 2014

(54) MULTI-PATH VALVE ARRANGEMENT IN A BEVERAGE MAKING UNIT

(75) Inventor: Thomas Mueller, Amriswil (CH)

(73) Assignee: Eugster/Frismag AG, Amriswill (CH)

(*) Notice: Subject to any disclaimer, the term of this patent is extended or adjusted under 35 U.S.C. 154(b) by 756 days.

(21) Appl. No.: 12/653,353

(22) Filed: Dec. 11, 2009

(65) Prior Publication Data

US 2010/0147158 A1    Jun. 17, 2010

(30) Foreign Application Priority Data

Dec. 12, 2008  (DE) ................ 20 2008 016 400 U

(51) Int. Cl.
  *A47J 31/24* (2006.01)
  *A47J 31/46* (2006.01)

(52) U.S. Cl.
  USPC .......... 99/293; 99/302 R; 99/307; 99/323.1

(58) Field of Classification Search
  USPC ............ 99/293, 323.1, 302 R, 289 R, 307; 137/625.4, 625.41
  See application file for complete search history.

(56) References Cited

U.S. PATENT DOCUMENTS

| | | | | |
|---|---|---|---|---|
| 3,841,551 A | * | 10/1974 | Ota | 236/86 |
| 5,313,984 A | * | 5/1994 | Garwood et al. | 137/625.48 |
| 5,498,757 A | * | 3/1996 | Johnson et al. | 426/520 |
| 5,601,651 A | * | 2/1997 | Watabe | 118/715 |
| 6,561,079 B1 | * | 5/2003 | Muller et al. | 99/282 |
| 7,448,314 B2 | * | 11/2008 | Ioannone et al. | 99/452 |
| 7,930,972 B2 | * | 4/2011 | Denisart et al. | 99/295 |
| 2009/0114099 A1 | * | 5/2009 | Gotlenboth | 99/288 |
| 2012/0118164 A1 | * | 5/2012 | Tonelli et al. | 99/280 |

FOREIGN PATENT DOCUMENTS

| | | |
|---|---|---|
| DE | 10 2004 006 095 | 9/2005 |
| EP | 1374748 | 12/2006 |
| EP | 1519670 | 2/2007 |
| WO | WO 2006/050881 | 5/2006 |

* cited by examiner

*Primary Examiner* — Reginald L Alexander
(74) *Attorney, Agent, or Firm* — DLA Piper LLP (US)

(57) ABSTRACT

A multi-path valve arrangement in a beverage making unit by which, optionally, various beverages can be prepared. The multi-path valve arrangement includes a multi-path valve with a housing provided with a cold milk inlet, a cold water inlet, a valve outlet and an air opening. A valve body in the housing is suited to connect the cold milk inlet having an adjustable throttling with the valve outlet. The valve body is set by a step motor which is connected with a programmable control of the valve body position.

3 Claims, 4 Drawing Sheets

MULTI-PATH VALVE ARRANGEMENT IN A BEVERAGE MAKING UNIT

BACKGROUND OF THE INVENTION

1. Field of the Invention

The present invention relates to a multi-path valve arrangement in a beverage making unit, particularly an espresso machine by which optionally various beverages can be prepared.

2. Description of the Related Art

Prior art multi-path valve arrangements in a beverage making unit which make possible in espresso machines an optionally alternate preparation of hot milk or milk froth and cold rinsing and aeration of the milk-conducting pipes may be realized by means of solenoid valves which are either controlled by manually actuated contacts or a set, program-controlled, into either a through-connecting position or a blocking position. Such multi-part multi-path valve arrangements require a plurality of connections and connectors to the functional units controlled by them. Due to the system, the solenoid valves comprise movable mechanical elements disposed in the milk flow and hence are difficult to rinse. In view of their type of construction and the cross sections of the pipes preset by the design which can be switched to either completely through-connecting or blocked only, these solenoid magnets conduct, with identical suction power sucking the milk, always the same milk flow, unless blocked, independently from whether the milk flow is required for hot milk preparation or for milk froth preparation. Since for the preparation of hot milk a larger amount of steam, or energy, for heating the milk is required than for milk froth preparation, it is necessary that in beverage making units, particularly espresso machines, in which such a multi-path valve arrangement comprising multi-path valves has been provided, a larger amount of steam, or energy, respectively, has to be provided for heating the milk than for preparing the milk froth, which causes increased production costs. Moreover, since always the same amount of milk is heated by the steam flow which is supplied for heating during a given time but which may have different temperatures, the milk temperature will not always obtain the desired value but will be either too high or too low.

Further prior art multi-path valve arrangements each including a mechanical hand-actuated multi-path valve, as compared thereto, may be realized in a more compact structure with less terminals; as a rule, however, they permit restricted functions only, without cold rinsing and aeration of milk-conducting pipes so that undesired milk residues may remain in them.

BRIEF SUMMARY OF THE INVENTION

It is therefore an object of the invention to selectively supply, in a beverage making machine, particularly an espresso machine, by means of a compact multi-path valve arrangement, milk in optimally dosed amount, or corresponding mass flow, respectively, for hot milk preparation or milk froth preparation, and to also perform, alternatively, by means of this multi-path valve arrangement automated, efficient cleaning of the milk-conducting pipes or flow paths.

The present invention, relates to a multi-path valve arrangement in a beverage making unit, particularly an espresso machine by which optionally various beverages can be prepared and which includes at least one cold milk inlet, a cold water inlet, a valve outlet and at least one valve body via which the cold milk inlet or the cold water inlet may be connected with the valve outlet; and it is characterized in that the multi-path valve arrangement comprises a multi-path valve having a housing which includes the cold milk inlet, the cold water inlet, the valve outlet and an air opening and in which a valve body is suited to connect the cold milk inlet having an adjustable throttling with the valve outlet, that the valve body is adjustable by a step motor, and that the step motor is provided with a programmable control of the valve body position.

By the compact multi-path valve of the present multi-path valve arrangement not only flow paths, particularly those of the cold milk for making hot milk or milk froth are switched over, the milk passage for both methods of preparation is rather dosed optimally in that the cold milk passage for hot milk preparation is throttled in relation to the hot milk passage for milk froth preparation so that for both preparation cases an identically small steam supply power for heating the milk is sufficient. The multi-path valve has thus an additional function of throttling in addition to the basic function of selecting one of a plurality of passage paths or flow paths.

Throttling is effected by adjusting the valve body relative to the housing of the multi-path valve having openings which co-operate with flow paths of the valve body by means of a step motor which adjusts the valve body position according to a programmable control.

The different throttling, or non-throttled passage of the cold milk through the multi-path valve corresponds to the effective flow cross section at the junction between the cold milk inlet or the valve outlet, respectively, of the valve housing, on one hand, and to the flow path opening of the valve body each co-operating with the housing opening in the housing, on the other, which in each case is adjusted with respect to the housing opening. The effective flow cross section, therefore, depends on a shift of the housing opening at the milk inlet opposite the opening of the flow path of the valve body adjusted to the housing opening.

In this way, it is also possible to perform a fine adjustment of the milk passage cross section which controls the milk passage amount sucked in by a steam flow through the flow path of the multi-path valve. The sucking-in steam flow is generated, in particular, in a frothing head of the espresso machine. The fine adjustment referred to above can be made by the manufacturer, particularly to balance out manufacturing tolerances. Such fine adjustment may, however, also be made later on, if desired, by the user of the beverage making unit, particularly the espresso machine, or by means of a temperature sensor detecting the milk temperature, together with a temperature control, in order to obtain, independently from the milk temperature, hot milk or milk froth heated to a desired temperature.

The multi-path valve arrangement according to the invention, moreover, permits, by means of the multi-path valve, to set adjustments of cold water rinsing of the milk-conducting pipes, or flow paths, or aeration, respectively, i.e. an emptying of these paths, particularly from the cold water used for rinsing, without providing particular solenoid valves for this purpose in the milk conducting pipes.

By driving the valve body of the multi-path valve by means of the step motor controlled by the programmable control, through-connecting positions of the multi-path valve, throttled if required, are automatically adjusted for the various functional operations. i.e. milk froth preparation or hot milk preparation, cold water rinsing of the milk paths and aeration of the milk paths in the correct sequence.

The respective function is in this respect selected by means of a selection group and a program storage and control unit which are part of the programmable control.

The essential alternative basic functions of the multi-path arrangement are that in a first valve body position controlled by the programmable control, the cold milk inlet is connected non-throttled or minimally throttled, respectively, with the valve outlet, and in a second valve body position controlled by the programmable control, is connected, throttled, with the valve outlet, that in a third valve body position controlled by the programmable control, the cold water inlet is connected, non-throttled, with the valve outlet, and that in a fourth valve body position controlled by the programmable control, the air opening is connected with the valve outlet. According to this structure, the cold milk inlet at the housing of the multi-path valve, in a first valve body position controlled by the programmable control, is connected, non-throttled or minimally throttled, respectively, with the valve outlet or, in a second valve body position controlled by the programmable control, is connected, throttled, with the valve outlet. The advantage reached of the sufficient relatively small heating power supply, or steam supply, respectively, when heating the cold milk to the respective desired temperature for hot milk or milk froth has been explained further above. By means of this multi-path valve, moreover, it is possible to rinse, in a third controlled valve body position, the milk-soiled pipe, or flow paths, respectively, and to aerate them in a fourth valve body position.

Various embodiments are possible to realize a multi-path valve suitable for performing the multi-path arrangement according to the present invention:

According to the present invention, the valve body is shaped as a tap having a plurality of valve paths, the valve body may be shaped as a tap having a plurality of valve paths, which in order to adjust for a desired through-connection path can be rotated, if required with throttling, within the housing, the housing comprising an outer cylinder around the cylindrical tap, or an inner cylinder as valve body, respectively. The flow paths extend in particular in a plane of cross section radially within the inner cylinder. In the case of the present multi-path valve, the openings of the cold water inlet, of the cold milk inlet and the air opening are arranged in circumferential direction of the outer cylinder or housing. Throttling is obtained in this case by a small angular adjustment of the rotational position of the inner cylinder or tap relative to a full go-through position.

Alternatively, the valve body of the multi-path valve may be made as a slider or piston movable in the housing, or an outer cylinder, respectively. At least one section of the flow path of the piston or slider may extend vertically to a plane of cross section of the piston to selectively connect a valve outlet with a cold milk inlet, a cold water inlet or an air opening. Throttling is obtained in this case by fine displacement of the piston or slider.

Suitably, the multi-path valve is arranged in the beverage making unit, particularly an espresso machine, so that a frothing head is in flow connection with the valve outlet of the multi-path valve and an air solenoid valve. If and when the air solenoid valve passes air, milk froth is generated in the frothing head; in the other case, if the air solenoid valve does not pass air, hot milk is produced. In each case, cold milk is sucked in by the frothing head through the multi-path valve. Moreover, if the multi-path valve is correspondingly adjusted, the milk pipe may be rinsed by sucked-in cold water to remove the cold water from the milk pipe prior to the next milk passing process, and be aerated.

The foregoing arrangement may suitably be specified so that the frothing head is connected, via a milk pipe into which opens the air solenoid valve, to the valve outlet of the multi-path valve. The same functions are performed like in the structure of the present invention that a frothing head is in flow connection with the valve outlet of the multi-path valve and an air solenoid valve.

DETAILED DESCRIPTION OF THE INVENTION

Figure 1A:
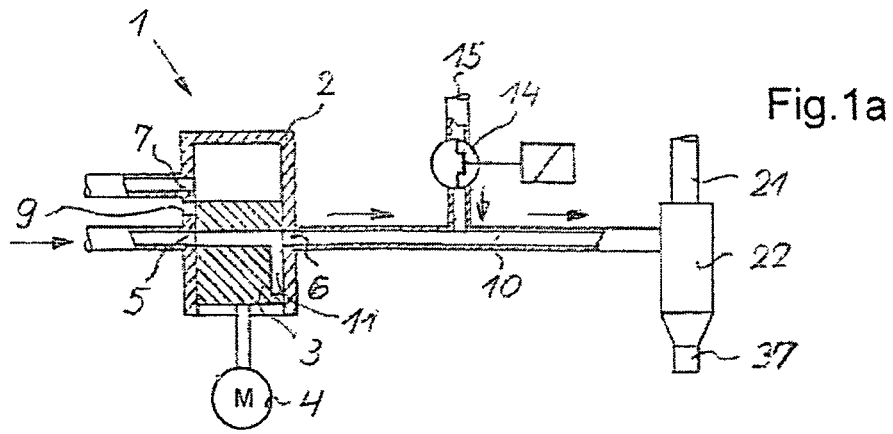
FIG. 1a shows a first embodiment of the multi-path valve connected via a milk pipe with a frothing head in a first valve body position wherein the multi-path valve and part of the milk pipe are depicted in longitudinal cross section.

In the following, exemplified embodiments will be explained based on a drawing comprising ten figures from which further advantageous details of the invention can be taken.

In FIG. 1, a multi-path valve in a first embodiment is designated by 1 which has, as a housing, a substantially closed outer cylinder 2 and, as a slider, a piston 3. The piston can linearly be moved via a step motor 4. The housing or outer cylinder 2 includes a valve inlet 5, which is a milk inlet, as well as a valve outlet 6. Further above, milk inlet 5 has more exactly been referred to as cold milk inlet. Above the valve inlet 5, on the outer cylinder 2, as a further valve inlet 7, a cold water inlet and an air opening 9 are disposed.

A milk pipe 10 connects the valve outlet 6 with a frothing head 22. Into the milk pipe 10, there opens an air duct 15 in which a solenoid valve 14 is arranged.

Figure 2:
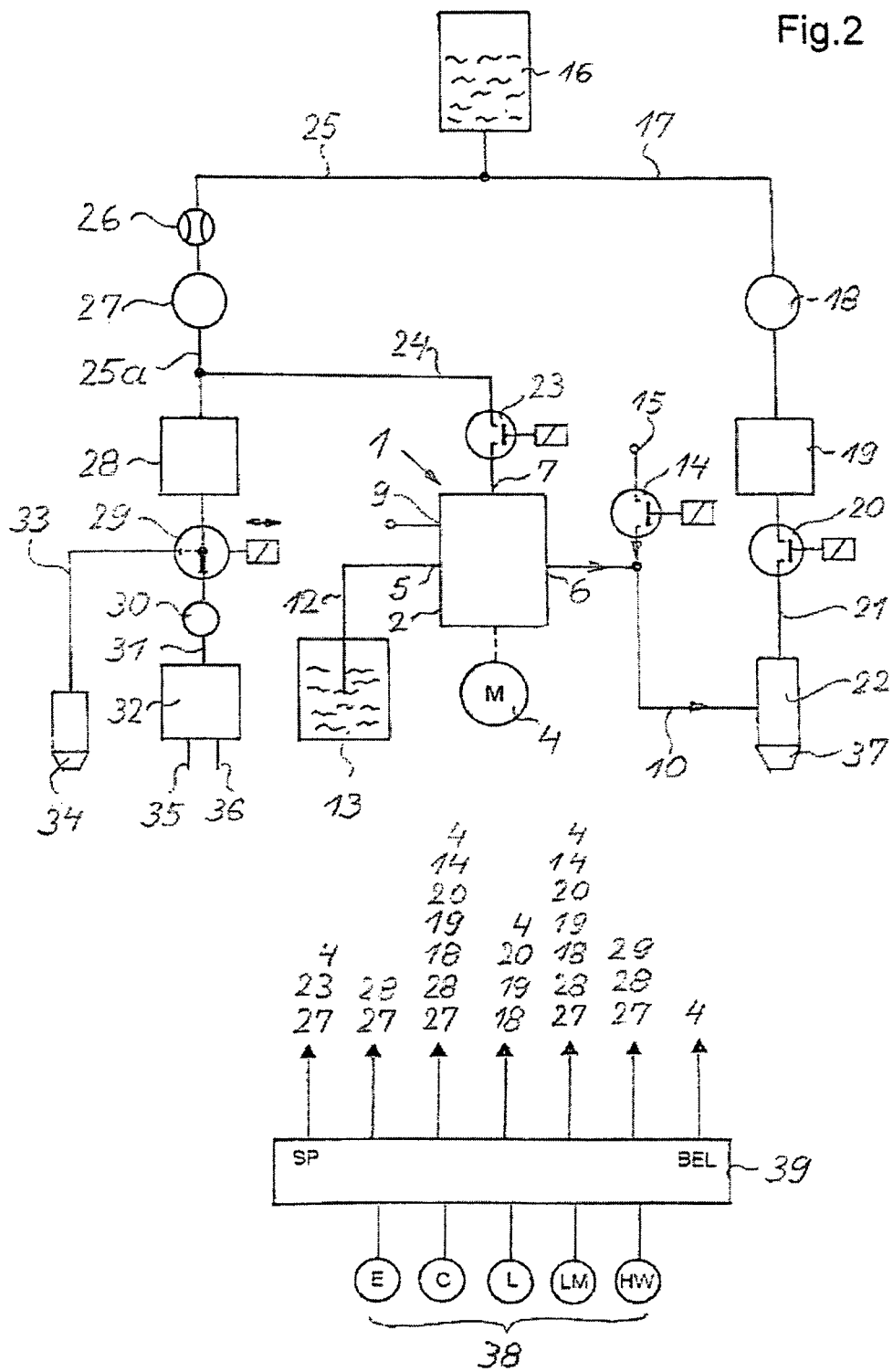
FIG. 2 shows a fluid diagram of an espresso machine based on the first embodiment of the multi-path valve.

In FIG. 2, essential components of an espresso machine as a beverage making unit are diagrammatically shown in which the multi-path valve is disposed as in accordance with FIG. 1a.

From FIG. 2 it can be taken that a water container 16 opens, via a cold water pipe 17, a pump 18, a continuous-flow heater 19, a solenoid valve 20 and a steam pipe 21, into a frothing head 22. Below an outlet 37 of the frothing head 22, a receiving vessel, not shown, may be provided.

The above-described components of FIG. 2 refer to the preparation of hot milk or milk froth.

In order to perform the primary espresso machine functions, i.e. those of espresso and coffee preparation by means of a brewing head 32 having two brewing head outlets 35 and 36, the brewing head 32 is connected with the hot water container 16 via a cold water pipe 25, a flow meter 26, a pump 27, a continuous flow heater 28, a two-way solenoid valve 29 and a hot water pipe 31 in which a stop valve 30 is disposed. From the two-way solenoid valve 29, furthermore, a hot water pipe 33 is branched off which leads to a hot water outlet 34.

From FIG. 2, it can, furthermore, be taken that downstream of the pump 27, branched off from cold water pipe 25a, a rinsing water pipe 24 leads via a solenoid valve 23 to the cold water inlet 7 of the multi-path valve 1. The milk inlet 5 of the multi-path valve 1 is, moreover, connected via a milk supply pipe 12 with a milk container 13.

In FIG. 2, additionally, a programmable control comprising a selection group 38 and a program storage and control unit 39 is diagrammatically indicated. Non-designated outlets of the program storage and control unit 39 lead to the elements of the espresso machine which correspond to the position reference numerals provided on the respective outlets. The abbreviation "SP" means "Rinsing", and the abbreviation "BEL" means "Aeration". In the selection group which activates a program portion corresponding to the beverage selected in the program and control unit 39 for the control of step motor 4, the abbreviations have the following meanings:

E=Espresso
C=Cappuccino
L=Hot milk
LM=Latte Macchiato
HW=Hot water

The functions "Rinsing" and "Aeration" are not included in the selection group because they are automatically activated.

In the following, to start with, milk froth preparation will be discussed.

For the preparation of a beverage selected by means of the selection group 38 in FIG. 2, the milk froth may be added to the brewed coffee which leaves the brewing head outlet 35 or 36, respectively, to prepare cappuccino or latte macchiato.

For milk froth preparation, cold water from the water container 16 is pumped via the cold water pipe 17 by means of the pump 18 through the continuous flow heater 19, in which the cold water is heated to become steam. The steam flows via the through-connected solenoid valve 20 and the steam pipe 21 into the frothing head 22. By means of a Venturi tube, not shown in the drawing, disposed in the frothing head 22 an under pressure is generated by the passing steam, which as can be taken in detail from FIG. 1a, sucks milk from the milk container 13, via the milk pipe 10, the milk inlet 5 in the housing or outer cylinder 2 of the multi-path valve 1, a valve path 11 of the piston or slider 3, the valve outlet 6 and the milk pipe 12, into the frothing head 22. The milk flowing through the milk pipe 10, downstream of the multi-path valve 1, sucks in, via the air pipe 15 and the through-connected solenoid valve 14, air which serves for frothing up the milk in the frothing head 22. The milk froth produced therein exits through the outlet 37 of the frothing head 22, for instance into a receiving vessel.

Figure 1B:
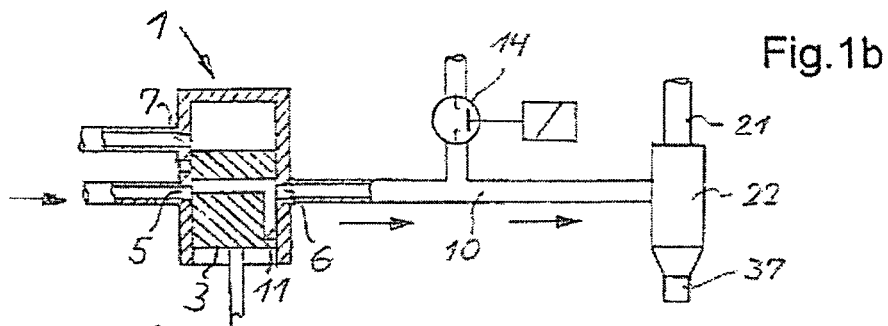
FIG. 1b shows the first embodiment as in FIG. 1a but in a second valve body position.

For alternative hot milk preparation, after respective actuation of the selection group 38, in order to reduce the sucked-in amount of milk, the effective flow or passage cross section of the valve inlet 5 and of the valve outlet 6 of the multi-path valve 1 is reduced in that by means of the step motor 4, the piston or slider 3 of the multi-path valve 1 is shifted so that, compare FIG. 1b, the valve path 11 of the piston is only partially aligned with the inlet 5 and the outlet 6 of the outer cylinder or housing 2. By the reduction obtained in operation of the amount of milk sucked-in, it is taken into consideration that in household espresso machines there is not normally sufficient heat energy available in order to heat, by means of the amount of steam generated in the continuous flow heater 19, a large amount of milk as a continuous flow or a larger milk flow.

The step motor driving the piston or slider 3 has been selected to correspond to the particular use for throttling the passage through the multi-path valve 1. In particular, the step motor 1 proceeds in small steps to perform a fine adjustment of the milk passage cross section which controls the passage of the milk, or amount of milk, respectively, sucked in by the frothing head 22. As referred to above, such fine adjustment may either be performed by the manufacturer in order to balance out manufacturing tolerances or may, subjectively, be selected by the user or, automatically, by means of a temperature sensor and temperature control which adjusts the milk temperature to a predetermined temperature.

As with reference to FIG. 2, for hot milk preparation, cold water from water container 16 is pumped via the cold water pipe 17 through the pump 18 through the continuous flow heater 19 in which the cold water is heated to become steam which is pumped through the through-connected solenoid valve 20 and the steam pipe 21 into the frothing head 22. By means of the Venturi tube disposed in the frothing head 22, an under pressure is generated by the passing steam which sucks milk from the milk container 13, via the milk supply pipe 12, the valve inlet or milk inlet 5 of the outer cylinder or housing 2, the valve path 11 of the piston or slider 3, as can be taken from FIG. 1b, the valve outlet 6 of the outer cylinder or housing 2 and the milk pipe 3, into the frothing head 22. Since during the course of this process, the solenoid valve 14 is not through-connected, no air will be added to the milk flowing through the milk pipe 10. The milk arriving in the frothing head 22 is heated during the course of the passage through the frothing head by the steam which is supplied via the steam pipe 21 into the frothing head. The heated milk exits through the outlet 37 of the frothing head 22 into a receiving vessel.

Cold rinsing of the milk pipe 10, of the frothing head 22 and of the valve path 11 of the piston or slider 3 is automatically controlled by he control unit and program storage 39 when the predetermined conditions, for instance a number of hot milk or milk froth preparation processes have been fulfilled. The rinsing process has been provided for hygienic reasons and is performed by means of cold water since a rinsing process with hot water or hot steam could lead to clogging or burning of milk residues.

Figure 1C:
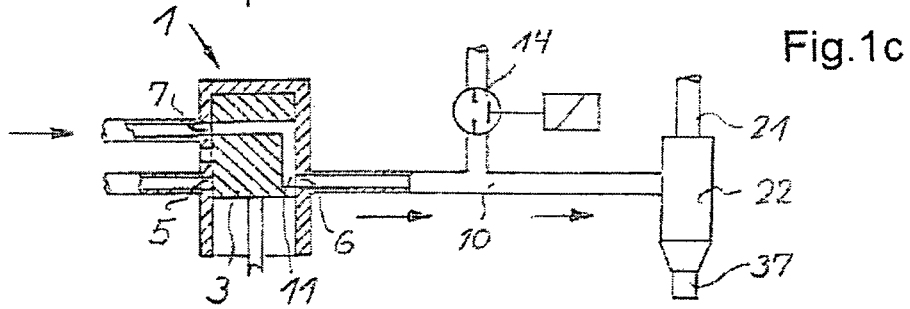
FIG. 1c shows the first embodiment of the multi-path valve as in FIGS. 1a and 1b but in a third valve body position.
Figure 1D:
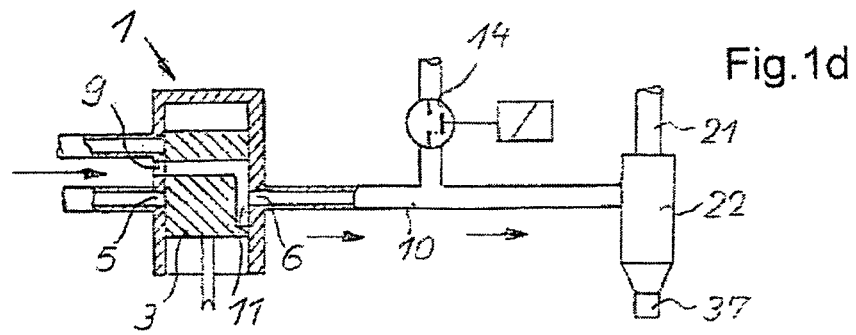
FIG. 1d shows the first embodiment of the multi-path valve as in FIGS. 1a through 1c but in a fourth valve body position.

For the rinsing process, the piston or slider 3 is positioned, as can be taken from FIG. 1c, so that the valve path 11 connects the valve inlet or cold water inlet 7 with the valve outlet 6, with maximum passage without throttling. In this way, also with reference to FIG. 2, cold water is pumped from the cold water container 16 via the cold water pipe 25 by means of pump 27, via the rinsing water pipe 24, the through-connected solenoid valve 23 and the cold water valve inlet 7 of the multi-path valve 1, via the valve path 11 of the piston or slider 3 and the outlet 6 of the multi-path valve 1 through the milk-loaded milk pipe 10 and the frothing head 22.

Aeration of the milk pipe 10 and of the flow path 11 of the multi-path valve 1 is necessary to allow them to become empty before renewed hot milk or milk froth preparation process can start. For aeration, the piston or slider 3 is adjusted by means of the step motor 4 to the position according to FIG. 1d, i.e. lowered that far so that the air opening in the outer cylinder or housing 2 is connected via the valve path 11 with the outlet 6 of the multi-path valve. To this end, that section of the valve path, perpendicular in the drawing, is partly used which in case of cold water rinsing according to FIG. 1c is completely flown through and in case of the hot milk preparation according to FIG. 1b is flown through for a small part, not however in case of milk froth preparation according to FIG. 1a.

Therefore, in the position of the piston or slider 3, aeration and thus emptying of the valve path 11, of the milk pipe 10 and also of the frothing head 22 can be performed.

By means of the espresso machine shown in FIG. 2, it is possible to make espresso as usual. To this end, cold water is pumped from the cold water container 16 via the cold water pipe 25, further by the pump 27, via the cold water pipe 25a through the continuous flow heater 28 in which the cold water is heated to become hot water. The hot water flows via the valve position indicated in FIG. 2 of the two-way solenoid valve further via the stop valve 30 into the brewing head 32. The stop valve prevents in particular phases of the coffee stock preparation a return flow sucking from the brewing head. The brewed coffee exits via the brewing head outlets 36 and 37 into a receiving vessel. The amount of water required for coffee preparation is limited by means of the above-referenced flow meter 26.

For an alternatively possible preparation of hot water, the cold water flows, as in the case of espresso preparation, if necessary in a differently dimensioned amount determined by the flow meter 26, for heating through the continuous flow heater 28 and subsequently via the two-way solenoid valve 29 switched to the hot water pipe 33, the switch-over position being indicated by a broken line in FIG. 2. The hot water arrives via the hot water pipe 33 into the hot water outlet 34 from which it can be recovered for the preparation of a different beverage.

Figure 3A:
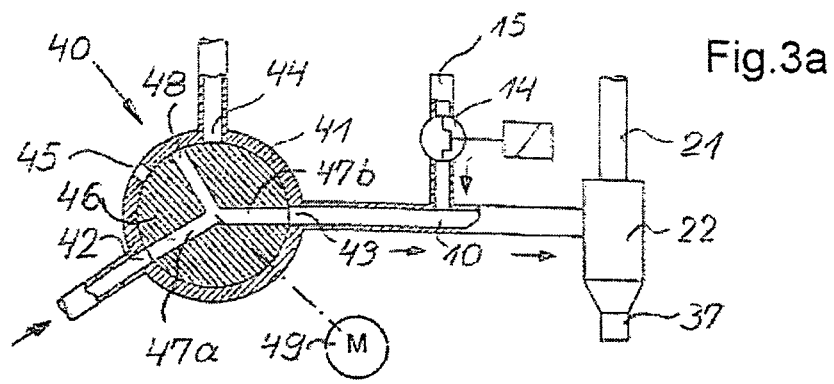
FIG. 3a shows a second embodiment of the multi-path valve connected via a milk pipe with a frothing head in a first valve body position wherein the multi-path valve and part of the milk pipe are depicted in longitudinal cross section.
Figure 3B:
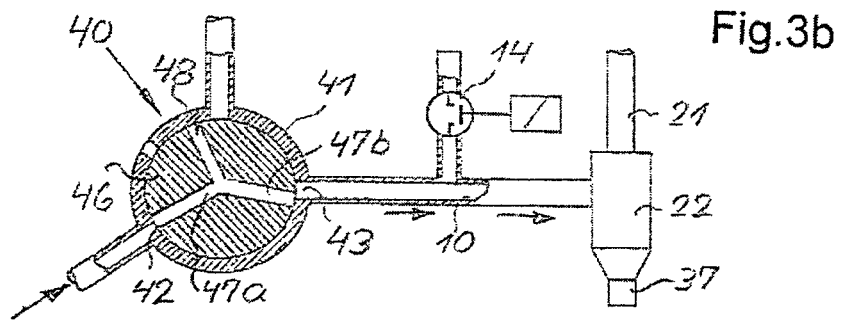
FIG. 3b shows the second embodiment of the multi-path valve as in FIG. 3a but in a second valve body position.
Figure 3C:
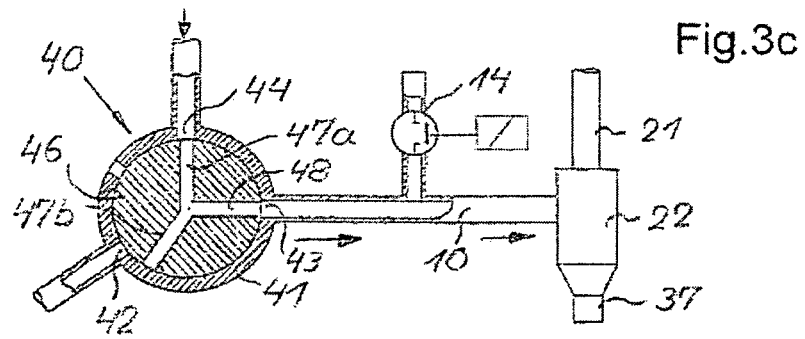
FIG. 3c shows the second embodiment of the multi-path valve as in FIGS. 3a and 3b but in a third valve body position.
Figure 3D:
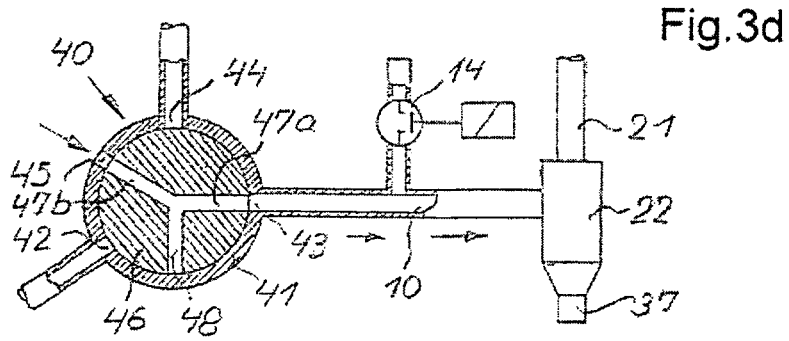
FIG. 3d shows the second embodiment of the multi-path valve as in FIGS. 3a through 3c but in a fourth valve body position.
Figure 4:
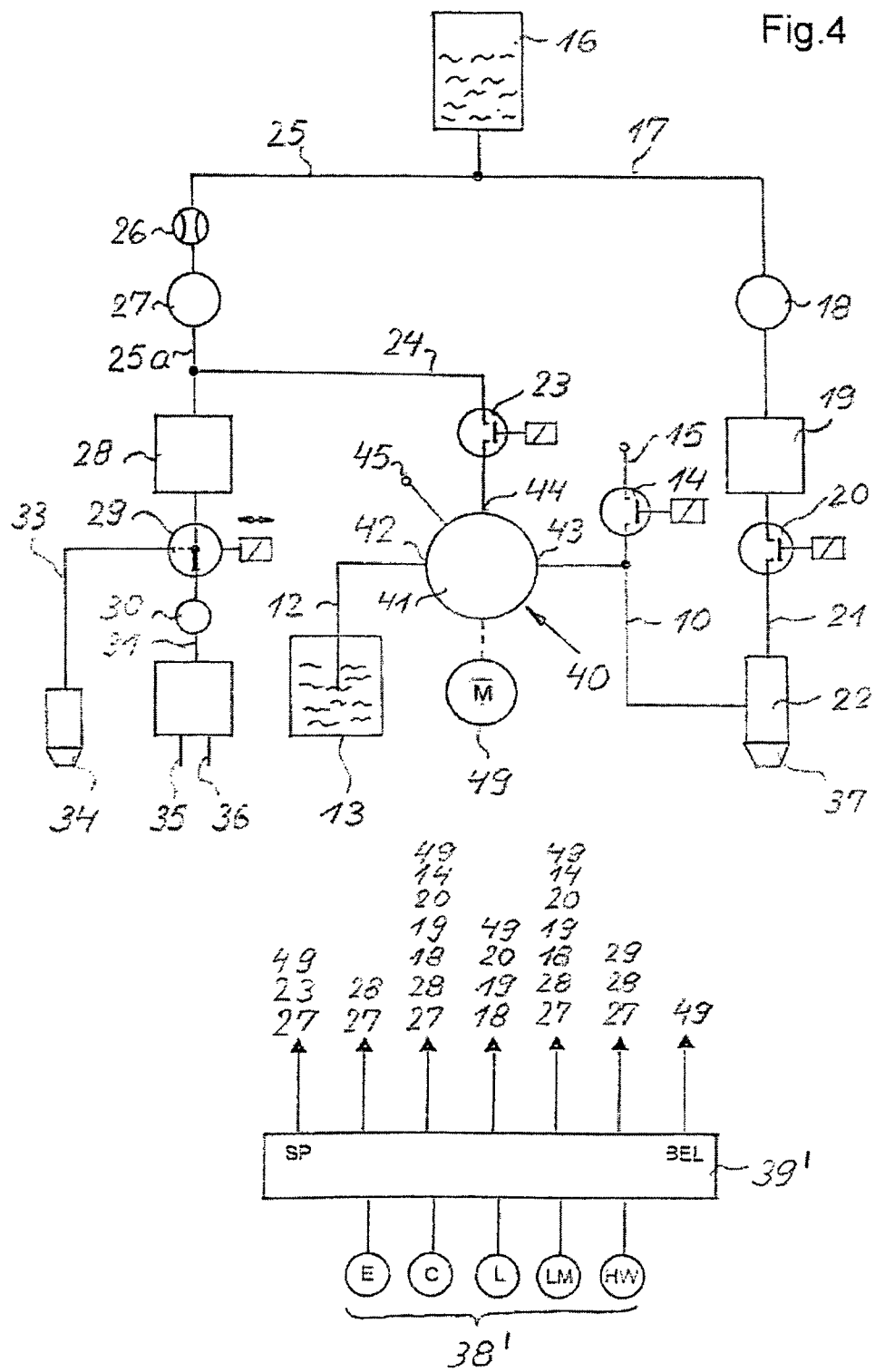
FIG. 4 shows a fluid diagram of an espresso machine based on the second embodiment of the multi-path valve

The second embodiment of the espresso machine as a beverage making unit according to FIG. 4 differs from the one according to FIG. 2 essentially by a different embodiment of the multi-path valve which in this case is designed with a valve body as a tap having a plurality of valve paths depicted in detail in FIGS. 3a through 3d. The step motor 49 and the program storage and control unit 39' are adapted to the embodiment of the multi-path valve having a rotating tap which is hence arranged rotating by the step motor 49 as an inner cylinder in a housing formed as an outer cylinder. The housing 41 shaped as an outer cylinder, on the other hand, shows a valve inlet 42 as milk inlet or cold milk inlet, a valve inlet 44 as cold water inlet, a valve outlet 43 and an air opening 45 which as shown in FIGS. 3a through 3d, are staggered relative to each other in peripheral direction of the outer cylinder or housing 41. For alternative complete or throttled connection of the valve inlet as milk inlet 42, of the valve inlet as cold water inlet 44 or of the air inlet 45, valve paths 47a, 47b and 48 have been formed out staggered in the inner cylinder or tap 46 of the multi-path valve 40 in peripheral direction of the inner cylinder 46, as can in detail be taken from FIGS. 3a through 3d.

It should be noted that in the exemplified embodiments according to FIGS. 3a through 3d and 4, reference numerals corresponding to those of the first exemplified embodiment have been used.

For milk froth preparation, the inner cylinder or tap 46 is rotated according to FIG. 3a by means of the step motor 49 so that the valve path 47a is in alignment with the valve inlet or milk inlet 42 and the valve path 47b following valve path 47a is in alignment with valve outlet 43.

In this position of the multi-path valve 40, referring now to FIG. 4, cold water is pumped from the cold water container 16 via the cold water pipe 17 by means of pump 18 through the continuous flow heater 19 in which the cold water is heated to become steam. The steam emerging from the continuous flow heater is further supplied, via the through-connected solenoid valve 20 and the steam pipe 21 to the frothing head 22. The Venturi tube, not shown in FIG. 4, arranged in the frothing head 22, generates, by the passing steam an under pressure which, via the milk supply pipe 12, the valve inlet as milk inlet 42 of the multi-path valve 42, the valve flow paths 47a and 47b of the inner cylinder or tap 46, the valve outlet 43 of the multi-path valve 40 and the milk pipe 10, sucks milk from the milk container 13 up to the frothing head 22. The milk flowing through the milk pipe 10 sucks in, via the air pipe 15 and the through-connected solenoid valve 14, air which serves for frothing up in the frothing head 22. The milk froth produced exits through the outlet 37 of the frothing head into a receiving vessel.

In connection with hot milk preparation, the espresso machine according to FIGS. 3a and 4 performs the same functions as in connection with the preparation of milk froth, save for the exceptions discussed in the following:

In order to take into account the low-limited heat efficiency normally available in household espresso machines and in order to heat by the amount of steam correspondingly generated a larger amount of milk to pass through, the passage cross section or flow cross section of the valve inlet as milk inlet 42 and of the valve outlet 43 in the multi-path valve 40 is reduced as compared to the situation in case of milk froth production in order to reduce the milk flow sucked in, in that the inner cylinder or tap 46 of the multi-path valve is rotated by means of the step motor 49 so that the valve paths 47a, 47b of the inner cylinder or tap 46 are not completely in alignment with the valve inlet as milk inlet 42 and the outlet 43, respectively, of the multi-path valve 40.

The step motor 49 driving the inner cylinder or tap 46 which is suited to perform small steps adapted to the use in question, can moreover perform a fine adjustment of the flow cross section or passage cross section for the milk flow sucked in by the frothing head 22. The fine adjustment may be performed, as mentioned, by the manufacturer in order to balance out manufacturing tolerances, or may from case to case be selected by the user of the espresso machine, or a predetermined temperature of the milk may automatically be regulated by means of a temperature sensor and a temperature control.

The remaining processes for hot milk preparation proceed in the same manner as in the exemplified embodiment described further above.

For cold rinsing of the valve paths 47a and 47b of the inner cylinder or tap 46 of the milk-loaded milk pipe 10 and of the frothing head 22, the inner cylinder or tap 46 is rotated by the step motor 49 so that the valve path 47a is in alignment with the valve inlet as cold water inlet 44 of the multi-path valve 10 and the valve path 48 is in alignment with the outlet 43 of the multi-path valve 40. From the cold water container 16 cold water may, subsequently, be pumped via the cold water pipe 25 by means of the pump 27 via the rinsing water pipe 24, the through-connected solenoid valve 23 and the valve inlet as cold water inlet 44 of the multi-path valve 40 through the valve paths 47a and 48 of the inner cylinder or tap 46 and the valve outlet 43 of the multi-path valve 40 through the milk-loaded milk pipe 10 and the frothing head 22.

For aeration of the milk-loaded flow paths in order to empty them, the inner cylinder or tap 46 of the multi-path valve 40 is rotated, according to FIG. 3d, by means of step motor 49—compare also FIGS. 3a and 4—so that the air opening 45 of the outer cylinder or housing 41 is in alignment with the valve path 47b and the valve outlet 43 of the multi-path valve 40 is in alignment with the valve path 47a immediately following the valve path 47b. In this way, aeration and emptying of the valve paths 47a and 47b and of the milk pipe 10 and of the frothing head 22 is achieved.

An espresso preparation and an alternative hot water preparation may be effected by means of the second embodiment of the espresso machine according to FIG. 4 as described in connection with the first embodiment based on FIG. 2.

The invention claimed is:

1. Multi-path valve arrangement in a beverage making unit, particularly an espresso machine by which optionally various beverages can be prepared and which includes at least one cold milk inlet, a cold water inlet, a valve outlet and at least one valve body via which said cold milk inlet or said cold water inlet may be connected with said valve outlet, wherein
   said multi-path valve arrangement comprises a multi-path valve having a housing which includes said cold milk inlet, said cold water inlet, said valve outlet and an air opening and in which a valve body is suited to connect said cold milk inlet having an adjustable throttling with said valve outlet,
   said valve body is adjustable by a step motor,
   said step motor is provided with a programmable control of the valve body position, and
   a frothing head is in flow connection with said valve outlet of said multi-path valve and an air solenoid valve,
   in a first valve body position controlled by said programmable control, said cold milk inlet is connected non-throttled or minimally throttled, respectively, with said valve outlet,
   in a second valve body position controlled by said programmable control, said cold milk inlet is connected, throttled, with said valve outlet,
   in a third valve body position controlled by said programmable control, said cold water inlet is connected, non-throttled, with said valve outlet,
   in a fourth valve body position controlled by said programmable control, said air opening is connected with said valve outlet,
   said valve body is either shaped as a tap having a plurality of valve paths, in which
      for milk froth preparation, the tap is rotated by means of the step motor so that a first one of the valve paths is in alignment with the cold milk inlet and a second one of the valve paths following the first valve path is in alignment with the valve outlet, and
      in order to heat milk, the tap is rotated by means of the step motor so that the first valve path and the second valve path are not completely in alignment with the cold milk inlet and the outlet,
   or said valve body is shaped as a slider having at least one valve path, in which
      in order to heat milk, the slider is shifted so that the valve path of the slider is only partially aligned with the inlet and the outlet of the housing.

2. Multi-path valve arrangement according to one of the foregoing claims, wherein said programmable control comprises a selection group and a program storage and control unit.

3. Multi-path valve arrangement according to claim 1, wherein said frothing head is connected, via a milk pipe into which opens an outlet of said air solenoid valve, to said valve outlet of said multi-path valve.

* * * * *